United States Patent [19]

Ishigaki

[11] Patent Number: 4,943,976
[45] Date of Patent: Jul. 24, 1990

[54] SPREAD SPECTRUM COMMUNICATION SYSTEM

[75] Inventor: Yukinobu Ishigaki, Tokyo, Japan

[73] Assignee: Victor Company of Japan, Ltd., Yokohama, Japan

[21] Appl. No.: 406,408

[22] Filed: Sep. 13, 1989

[30] Foreign Application Priority Data

Sep. 16, 1988 [JP] Japan .................. 63-233302

[51] Int. Cl.$^5$ .................................. H04K 1/00
[52] U.S. Cl. ................................................ 375/1
[58] Field of Search .......................... 375/1; 380/34

[56] References Cited

U.S. PATENT DOCUMENTS

| | | | |
|---|---|---|---|
| 3,808,536 | 4/1974 | Reynolds | 380/34 |
| 4,324,002 | 4/1982 | Spilker, Jr. | 380/34 |
| 4,443,799 | 4/1984 | Rubin | 375/1 |
| 4,630,283 | 12/1986 | Schiff | 375/1 |
| 4,644,523 | 2/1987 | Horwitz | 375/1 |
| 4,688,251 | 8/1987 | Citron et al. | 380/34 |
| 4,809,295 | 2/1989 | Zscheile, Jr. et al. | 375/1 |
| 4,862,479 | 8/1989 | Hamatsu et al. | 375/1 |
| 4,873,699 | 10/1989 | Saussier et al. | 375/1 |

FOREIGN PATENT DOCUMENTS 58-197935  11/1983  Japan .
60-86935   5/1985   Japan .

OTHER PUBLICATIONS

Robert Dixon, "Spread Spectrum Systems—Second Edition", 1984.

Primary Examiner—Salvatore Gancialosi
Attorney, Agent, or Firm—Lowe, Price, LeBlanc, Becker & Shur

[57] ABSTRACT

A transmitter of a spread spectrum communication system uses a first carrier, a second carrier, a third carrier, a first spread code, and a second spread code. The third carrier is generated by shifting the phase of the first carrier. The second spread code is generated by delaying the first spread code. The first carrier is modulated with an information signal to generate a primary modulation signal. A composite spread spectrum signal is generated by combining and mixing the primary modulation signal, the second carrier, the third carrier, the first spread code, and the second spread code. In a receiver of the system, a separation filter separates the composite spread spectrum signal into a first component and a second component related to the frequency of the first carrier and the frequency of the second carrier respectively. A signal corresponding to the primary modulation signal is demodulated by processing the first and second components of the composite spread spectrum signal. A fourth carrier synchronous with the demodulated signal is derived by processing the first and second components of the composite spread spectrum signal. The information signal is detected by mixing the demodulated signal and the fourth carrier.

5 Claims, 3 Drawing Sheets

FIG. 5
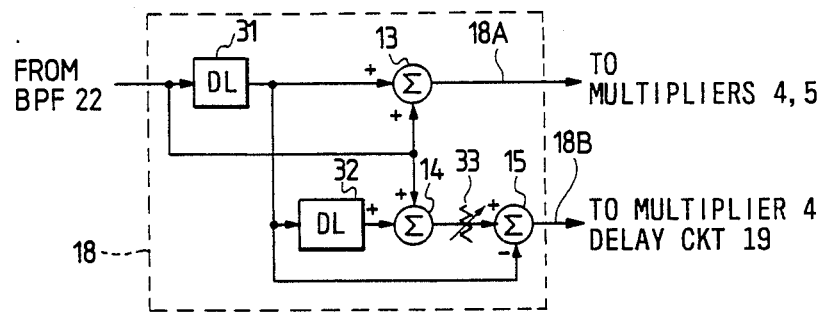
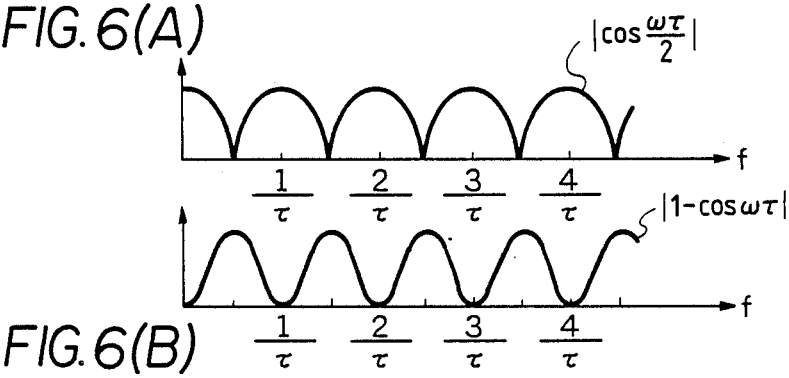
FIG. 6(A)
FIG. 6(B)
FIG. 7
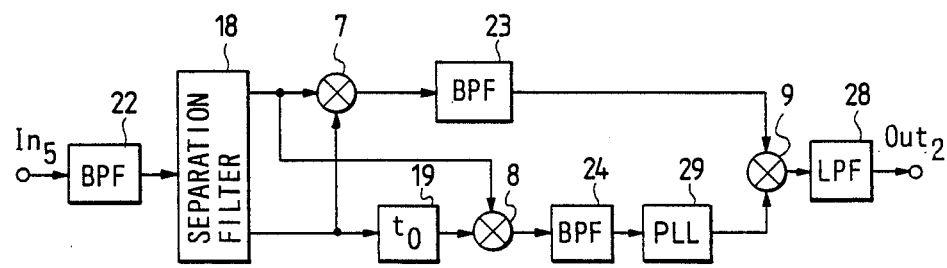

SPREAD SPECTRUM COMMUNICATION SYSTEM

BACKGROUND OF THE INVENTION

This invention relates to a spread spectrum communication system of a direct sequence type.

Spread spectrum communication systems are explained in various documents such as "Spread Spectrum Systems, Second Edition" written by R.C. Dixon and published from John Wiley & Sons, Inc., in 1984.

In some of conventional spread spectrum communication systems of a direct sequence type, a transmitter includes primary and secondary modulators. The primary modulator modulates a carrier with an information signal and thereby derives a primary modulation signal. The secondary modulator modulates the primary modulation signal with spread codes and thereby derives a secondary modulation signal (a spread spectrum signal). The spread spectrum signal is transmitted from the transmitter to a receiver of the conventional communication systems. The receiver includes a spread code generator generating spread codes which correspond to the spread codes used in the transmitter. The receiver also includes a despreading circuit which despreads the spread spectrum signal with the spread codes to recover a primary modulation signal from the spread spectrum signal. In the receiver of the conventional communication systems, the spread code generator tends to be complicated.

SUMMARY OF THE INVENTION

It is an object of this invention to provide a simple spread spectrum communication system of a direct sequence type.

According to a first aspect of this invention, a transmitter of a spread spectrum communication system comprises means for modulating a first carrier with an information signal to generate a primary modulation signal; means for adding the primary modulation signal and a second carrier to generate an addition signal; means for generating a first spread code and a second spread code in response to a clock signal, the second spread code being equal to the first spread code delayed by a predetermined time; means for multiplying the addition signal and the first spread code to spread a spectrum of the addition signal with the first spread code to generate a first spread spectrum signal; means for shifting a phase of the first carrier by a predetermined angle to generate a third carrier; means for multiplying the third carrier and the second spread code to spread a spectrum of the third carrier with the second spread code to generate a second spread spectrum signal; and means for adding the first spread spectrum signal and the second spread spectrum signal to generate a composite spread spectrum signal.

According to a second aspect of this invention, a receiver of a spread spectrum communication system comprises means for separating a composite spread spectrum signal into a first spread spectrum signal and a second spread spectrum signal related to a first predetermined frequency and a second predetermined frequency respectively; means for multiplying the first spread spectrum signal and the second spread spectrum signal to generate a first despread spectrum signal; means for delaying the second spread spectrum signal by a predetermined time to generate a third spread spectrum signal; means for multiplying the first spread spectrum signal and the third spread spectrum signal to generate a second despread spectrum signal; a first band pass filter filtering the first despread spectrum signal to demodulate a primary modulation signal from the first despread spectrum signal; a second band pass filter filtering the second despread spectrum signal; means for deriving a carrier component from an output signal of the second band pass filter; and means for mixing the demodulated primary modulation signal and the carrier component to perform sync demodulation to demodulate an information signal from the demodulated primary modulation signal.

According to a third aspect of this invention, a spread spectrum communication system comprises a transmitter and a receiver, the transmitter including means for modulating a first carrier with an information signal to generate a first primary modulation signal; means for adding the first primary modulation signal and a second carrier to generate an addition signal; means for generating a first spread code and a second spread code in response to a clock signal, the second spread code being equal to the first spread code delayed by a predetermined time; means for multiplying the addition signal and the first spread code to spread a spectrum of the addition signal with the first spread code to generate a first spread spectrum signal; means for shifting a phase of the first carrier by a predetermined angle to generate a third carrier; means for multiplying the third carrier and the second spread code to spread a spectrum of the third carrier with the second spread code to generate a second spread spectrum signal; and means for adding the first spread spectrum signal and the second spread spectrum signal to generate a composite spread spectrum signal; the receiver including means for separating the composite spread spectrum signal into a third spread spectrum signal and a fourth spread spectrum signal related to a frequency of the first carrier and a frequency of the second carrier respectively; means for multiplying the third spread spectrum signal and the fourth spread spectrum signal to generate a first despread spectrum signal; means for delaying the fourth spread spectrum signal by a predetermined time to generate a fifth spread spectrum signal; means for multiplying the third spread spectrum signal and the fifth spread spectrum signal to generate a second despread spectrum signal; a first band pass filter filtering the first despread spectrum signal to demodulate a second primary modulation signal, corresponding to the first primary modulation signal, from the first despread spectrum signal; a second band pass filter filtering the second despread spectrum signal; means for deriving a carrier component from an output signal of the second band pass filter, the carrier component being synchronous with the second primary modulation signal; and means for mixing the second primary modulation signal and the carrier component to perform sync demodulation to demodulate the information signal from the second primary modulation signal.

BRIEF DESCRIPTION OF THE DRAWINGS

FIG. 3 is a diagram showing the spectra of various signals in the system according to the first embodiment of this invention.

FIG. 5 is a block diagram of the separation filter of FIG. 2.

FIG. 6 is a diagram showing the frequency response characteristics of the separation filter of FIGS. 2 and 5.

FIG. 7 is a block diagram of a receiver of a spread spectrum communication system according to a second embodiment of this invention.

DESCRIPTION OF THE FIRST PREFERRED EMBODIMENT

Figure 1:
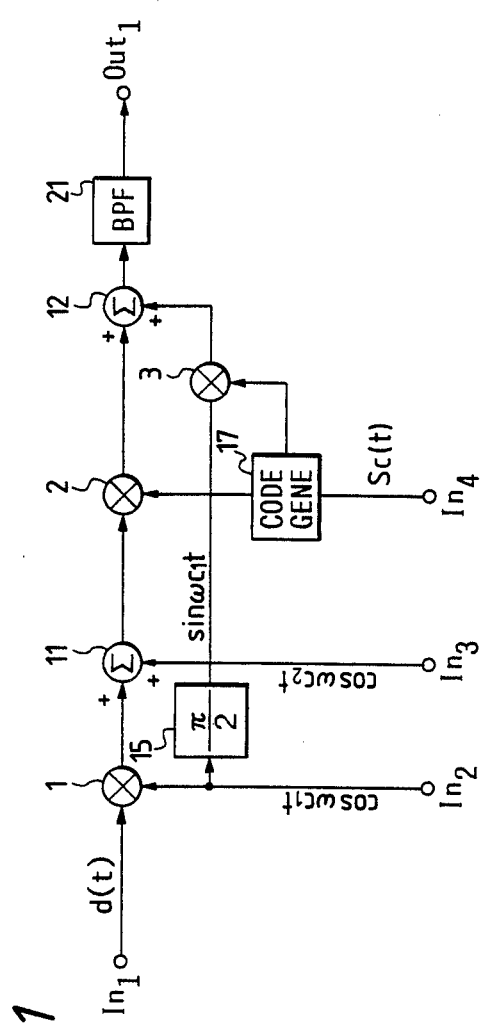
FIG. 1 is a block diagram of a transmitter of a spread spectrum communication system according to a first embodiment of this invention.

With reference to FIG. 1, a transmitter of a spread spectrum communication system includes a multiplier 1 receiving an information data signal d(t) in the form of a bipolar code which assumes $+1$ and $-1$ vai an input terminal In1 and also receiving a first carrier $\cos \omega c_1 t$ via an input terminal In2. The multiplier 1 mixes the information data signal d(t) and the first carrier $\cos \omega c_1 t$, generating a primary modulation signal (a biphase phase shift keying modulation signal, a BPSK modulation signal) $d(t) \cos \omega c_1 t$ which has a spectrum such as shown in the curve A1 of the part A of FIG. 3. The primary modulation signal is fed to an adder 11. A second carrier $\cos \omega c_2 t$ is fed to the adder 11 via an input terminal In3. The second carrier has a spectrum such as shown by the line A2 of the part A of FIG. 3. The adder 11 adds the primary modulation signal and the second carrier, generating an addition signal $d(t) \cos \omega c_1 t + \cos \omega c_2 t$. The addition signal is fed to a spectrum-spreading multiplier 2. The first carrier is also fed to a phase shifter 15 via the input terminal In2. The phase shifter 15 shifts the phase of the first carrier by $\pi/2$ and converts the first carrier into a third carrier $\sin \omega c_1 t$ having a quadrature relation with the first carrier. The third carrier outputted from the phase shifter 15 is fed to a multiplier 3.

A spread code generator 17 generates a first spread code P(t) and a second spread code P(t−to) which assume $+1$ or $-1$ in response to a clock signal Sc(t) fed via an input terminal In4. The second spread code P(t−to) is generated by delaying the first spread code P(t) by to which is set comparably with one period of the clock signal Sc(t). The first spread code P(t) is fed to the multiplier 2. The second spread code P(t−to) is fed to the multiplier 3. The spread code generator 17 preferably includes a section generating the first spread code in response to the clock signal, and a delay circuit delaying the first spread code to derive the second spread code.

The multiplier 2 mixes the output signal from the adder 11 and the first spread code, spreading the spectrum of the output signal from the adder 11 in accordance with the first spread code and generating a first spread spectrum signal expressed by:

$$P(t)\{d(t) \cos \omega c_1 t + \cos \omega c_2 t\}$$

The first spread spectrum signal is fed to an adder 12. The multiplier 3 mixes the output signal from the phase shifter 15 and the second spread code, spreading the spectrum of the output signal from the phase shifter 15 in accordance with the second spread code and generating a second spread spectrum signal expressed by:

$$P(t-to) \sin \omega c_1 t$$

The second spread spectrum signal is fed to the adder 12. The adder 12 adds the first and second spread spectrum signals, generating a composite spread spectrum signal SM(t) expressed by:

$$SM(t) = P(t)\{d(t) \cos \omega c_1 t + \cos \omega c_2 t\} + P(t-to) \sin \omega c_1 t$$

The composite spread spectrum signal SM(t) is fed to a band pass filter (BPF) 21. Only the main lobe of the composite spread spectrum signal SM(t) is passed through the BPF 21 to a transmitter output terminal Out1. The main lobe of the composite spread spectrum signal SM(t) has a spectrum such as shown in the part B of FIG. 3. The main lobe of the composite spread spectrum signal SM(t) is outputted via the output terminal Out1. For example, the output composite spread spectrum signal is transmitted to an antenna (not shown) via a power amplifier (not shown).

Figures 3A, 3B, 3C, 3D, 3E, 4:
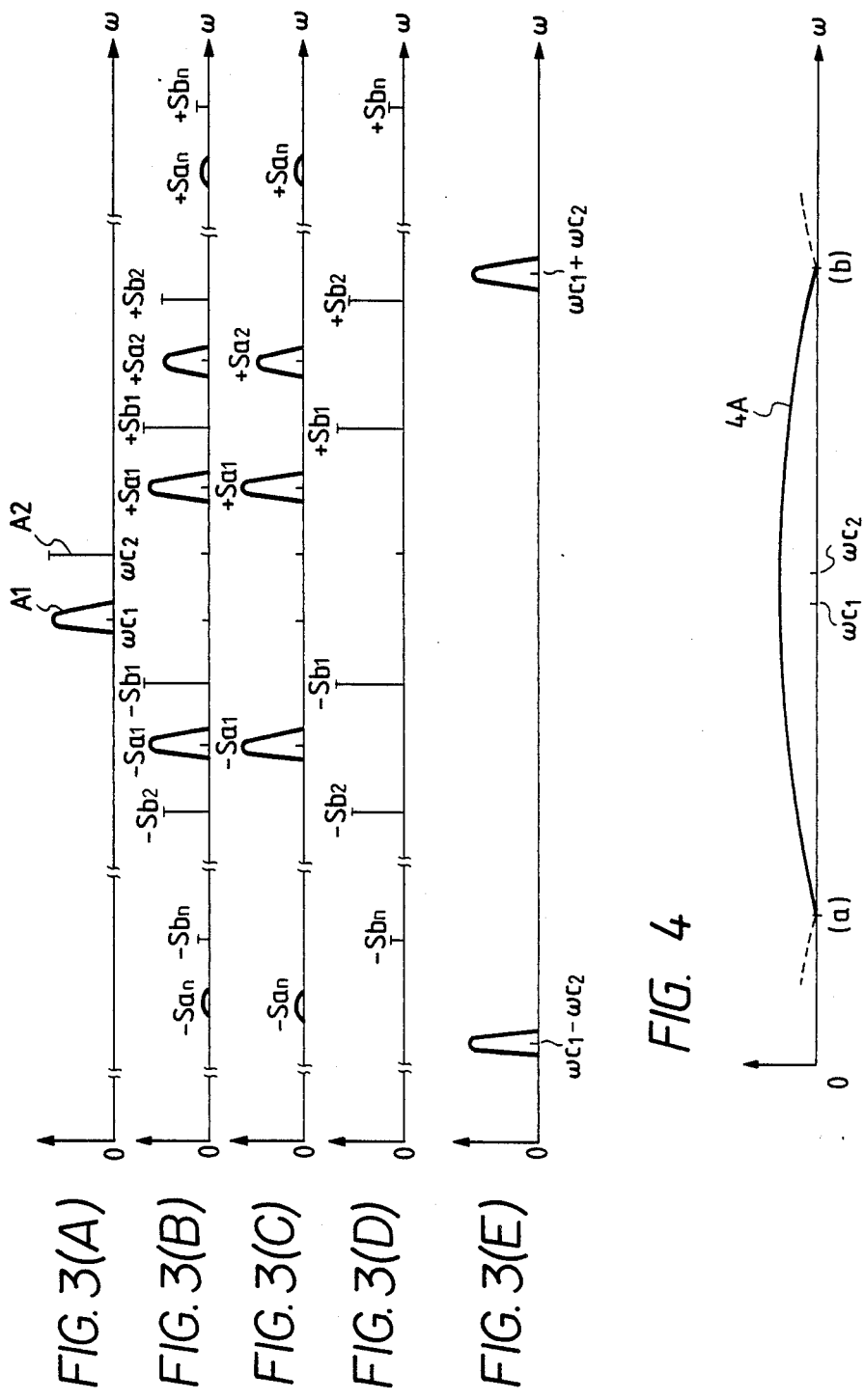
FIG. 4 is a diagram showing the spectrum of a spread spectrum signal.

Assuming that a maximum period sequence code (M sequence code) generated by a shift register of n stages which is driven by the clock signal Sc(t) having a period To is used as the first spread code P(t), the frequencies fc1 ($=\omega c_1/2\pi$) and fc2 ($=\omega c_2/2\pi$) are selected so as to satisfy the following equations: fc1~fc2=$\{2(2^n-1)To\}^{-1}$, and fc1=$m\{(2^n-1)To\}^{-1}$, where m is a natural number. In the frequency spectrum of the composite spread spectrum signal SM(t) which is shown in the part B of FIG. 3, the frequency interval between side bands +Sa1 and +Sa2 and the frequency interval between side bands +Sb1 and +Sb2 are equal to $\{(2^n-1)To\}^{-1}$. In addition, side bands +Sa1~+San and +Sb1~+Sbn are alternately spaced at equal intervals. So are side bands −Sa1~−San and −Sb1~−Sbn. FIG. 4 shows an example of the frequency spectrum of the composite spread spectrum signal SM(t), in which the solid curve 4A extending between the points (a) and (b) denotes the main lobe of the signal SM(t).

Figure 2:
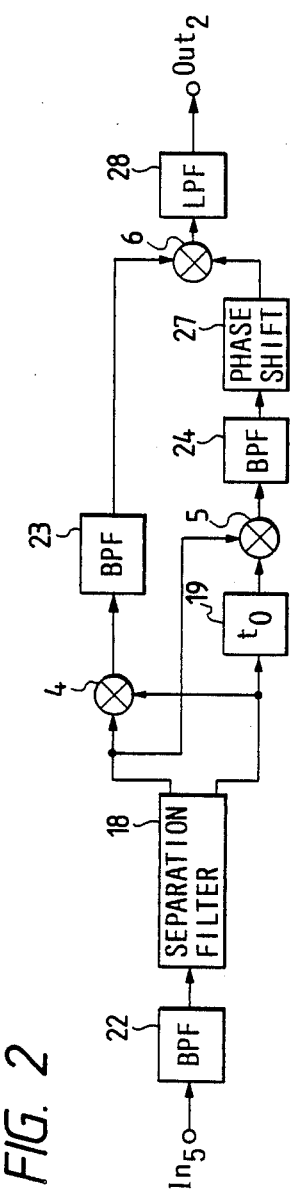
FIG. 2 is a block diagram of a receiver of the system according to the first embodiment of this invention.

As shown in FIG. 2, the composite spread spectrum signal SM(t) is inputted into a receiver via an input terminal In5. For example, the composite spread spectrum signal SM(t) is induced in an antenna (not shown) and is applied to the input terminal In5 via an amplifier (not shown). The composite spread spectrum signal SM(t) is transmitted from the input terminal In5 to a separation filter 18 via a BPF 22. The BPF 22 removes noises and signals having frequencies outside the band of the composite spread spectrum signal SM(t). The separation filter 18 separates the composite spread spectrum signal SM(t) into a first component S1(t) and a second component S2(t) which are related to the angular frequencies $\omega c_1$ and $\omega c_2$ respectively and which are expressed as:

$$S1(t) = \{d(t) + d(t-\tau)\}P(t)\cos\omega c_1 t + 2P(t-to)\sin\omega c_1 t$$

$$S2(t) = 2P(t)\cos\omega c_2 t$$

where the character $\tau$ denotes a predetermined time equal to $(2^n-1)$To.

The components S1(t) and S2(t) have the side bands $\pm$Sa1~$\pm$San and $\pm$Sb1~$\pm$Sbn shown in the parts C and D of FIG. 3, respectively.

The first component S1(t) is fed from the separation filter 18 to multipliers 4 and 5. The second component S2(t) is fed from the separation filter 18 to the multiplier 4 and a delay circuit 19. The delay circuit 19 delays the second component S2(t) by a predetermined time to. The output signal S2(t−to) from the delay circuit 19 is fed to the multiplier 5.

The multiplier 4 mixes the first component S1(t) and the second component S2(t), despreading the spectrum of the first component S1(t) in accordance with the second component S2(t) and generating a first despread spectrum signal S1(t)×S2(t) expressed as:

$$S_1(t) \times S_2(t) = 2\{d(t) + d(t - \tau)\} \times$$
$$\{P(t)\}^2 \cos\omega c_1 t \cdot \cos\omega c_2 t + 4P(t)P(t - t_0)\sin\omega c_1 t \cdot \cos\omega c_2 t =$$
$$\{d(t) + d(t - \tau)\}\{\cos(\omega c_1 t - \omega c_2 t) + \cos(\omega c_1 t + \omega c_2 t)\} +$$
$$2P(t) \times P(t - t_0)\{\sin(\omega c_1 t + \omega c_2 t) + \sin(\omega c_1 t - \omega c_2 t)\}$$

It should be noted that $\{P(t)\}^2$ equals 1. In this equation, the term "$\{d(t)+d(t-\tau)\} \cos (\omega c_1 t - \omega c_2 t)$" and the term "$\{d(t)+d(t-\tau)\} \cos (\omega c_1 t + \omega c_2 t)$" represent a pair of primary demodulation signals which are derived by the spectrum despread and which correspond to the primary modulation signal in the transmitter. On the other hand, the term "$2P(t)P(t-to)\{\sin (\omega c_1 t + \omega c_2 t) + \sin (\omega c_1 t - \omega c_2 t)\}$" represents spread components which are not demodulated. The first despread spectrum signal is fed from the multiplier 4 to a BPF 23. The BPF 23 has a narrow pass band tuned to one of the primary demodulation signals, selecting one of the primary demodulation signals. For example, the primary demodulation signal "$\{d(t)+d(t-\tau)\} \cos (\omega c_1 t - \omega_2 t)$" is selected. The BPF 23 outputs the selected primary demodulation signal to a multiplier 6.

The multiplier 5 mixes the first component S1(t) and the output signal S2(t−to) from the delay circuit 19, despreading the spectrum of the first component S1(t) in accordance with the output signal S2(t−to) from the delay circuit 19 and generating a second despread spectrum signal S1(t)×S2(t−to) expressed as:

$$S_1(t) \times S_2(t - t_0) = 2\{d(t) + d(t - \tau)\} \times P(t)P(t - t_0)\cos\omega c_1 t \cdot$$
$$\cos\omega c_2(t - t_0) + 4\{P(t - t_0)\}^2\sin\omega c_1 t \cdot \cos\omega c_2(t - t_0) = \{d(t) +$$
$$d(t - \tau)\}P(t)P(t - t_0) \times \{\cos(\omega c_1 t - \omega c_2 t + \omega c_2 t_0) +$$
$$\cos(\omega c_1 t + \omega c_2 t - \omega c_2 t_0)\} + 2\{\sin(\omega c_1 t + \omega c_2 t - \omega c_2 t_0) +$$
$$\sin(\omega c_1 t - \omega c_2 t + \omega c_2 t_0)\}$$

It should be noted that $\{P(t-to)\}^2$ equals 1. In this equation, the term "$2\{\sin (\omega c_1 t + \omega c_2 t o - \omega c_2 t o) + \sin (\omega c_1 t - \omega c_2 t + \omega c_2 t o)\}$" represents a pair of demodulation signals which are derived by the spectrum despread and which correspond to the first and second carriers in the transmitter. On the other hand, the term "$\{d(t)+d(t-\tau)\}P(t)P(t-to)\{\cos (\omega c_1 t - \omega c_2 t o) + \cos (\omega c_1 t + \omega c_2 t - \omega c_2 t o)\}$" represents spread components which are not demodulated. The output signal from the multiplier 5 is fed to a BPF 24. The BPF 24 has a narrow pass band tuned to one of the demodulation signals outputted from the multiplier 5, selecting one of the demodulation signals. For example, the demodulation signal "$2 \sin (\omega c_1 t - \omega c_2 t + \omega c_2 t o)$" is selected. The BPF 24 outputs the selected demodulation signal to a phase shifter 27. The phase shifter 27 converts the demodulation signal "$2 \sin (\omega c_1 t - \omega c_2 t + \omega c_2 t o)$" into a carrier "$2 \cos (\omega c_1 - \omega c_2)t$" synchronous with the primary demodulation signal "$\{d(t)+d(t-\tau)\} \cos (\omega c_1 t - \omega c_2 t)$".

The phase shifter 27 outputs the carrier "$2 \cos (\omega c_1 - \omega c_2)t$" to the multiplier 6.

The multiplier 6 mixes the primary demodulation signal "$\{d(t)+d(t-\tau)\} \cos (\omega c_1 t - \omega c_2 t)$" and the carrier "$2 \cos (\omega c_1 - \omega c_2)t$", performing sync demodulation and generating a secondary demodulation signal. The multiplier 6 outputs the secondary demodulation signal to a low pass filter (LPF) 28. The LPF 28 removes high frequency components "$\{d(t)+d(t-\tau)\} \cos 2(\omega c_1 - \omega c_2)t$" from the secondary demodulation signal and thereby derives information data components "$d(t)+d(t-\tau)$". Since the delay time $\tau$ is negligible with respect to the bit interval of the information data, the term "$d(t-\tau)$" is approximately equal to the term "$d(t)$". Therefore, the output signal from the LPF 28 equals the information data d(t) in the transmitter. The output signal from the LPF 28 is applied to a receiver output terminal Out2.

The separation filter 18 is composed of a comb filter. As shown in FIG. 5, the separation filter 18 includes a delay circuits 31 and 32, adders 13 and 14, a gain adjuster 33, and a subtracter 15. The separation filter 18 has a single input terminal and two output terminals 18A and 18B. The composite spread spectrum signal SM(t) is fed from the BPF 22 to the delay circuit 31 and the adders 13 and 14 via the input terminal of the separation filter 18. The output signal from the delay circuit 31 is fed to the adder 13, the delay circuit 32, and the subtracter 15. The adder 13 adds the composite spread spectrum signal SM(t) and the output signal from the delay circuit 31, deriving the first component S1(t) of the composite spread spectrum signal SM(t). The first component S1(t) of the composite spread spectrum signal SM(t) is fed to the multipliers 4 and 5 (see FIG. 2) via the output terminal 18A of the separation filter 18. The output signal from the delay circuit 32 is fed to the adder 14. The adder 14 adds the composite spread spectrum signal SM(t) and the output signal from the delay circuit 32. The output signal from the adder 14 is fed to the subtracter 15 via the gain adjuster 33. The subtracter 15 subtracts the output signal of the delay circuit 31 from the gain-adjusted output signal of the adder 14, deriving the second component S2(t) of the composite spread spectrum signal SM(t). The second component S2(t) of the composite spread spectrum signal SM(t) is fed to the multiplier 4 (see FIG. 2) and the delay circuit 19 (see FIG. 2) via the output terminal 18B of the separation filter 18.

The separation filter 18 will be further described hereinafter. The delay circuits 31 and 32 have the same delay times "$\tau$". The gain adjuster 33 halves the transmission level of the output signal from the adder 14. It is now assumed that a signal "$\sin \omega t$" is inputted into the separation filter 18 via its input terminal. In this assumed case, the output signal $f(\tau,\omega)$ from the adder 13 is expressed as follows.

$$f(\tau,\omega) = \sin\omega t + \sin\omega(t - \tau)$$
$$= 2\cos(\omega\tau/2) \cdot \sin\omega(t - \tau/2)$$

In the assumed case, the output signal $g(\tau,\omega)$ from the subtracter 15 is expressed as follows.

$$g(\tau,\omega) = (1/2)\{\sin\omega t + \sin\omega(t - 2\tau)\} - \sin\omega(t - \tau)$$
$$= -(1 - \cos\omega\tau) \cdot \sin\omega(t - \tau)$$

As understood from these equations, the frequency response characteristics of the separation filter 18 between the input terminal and the output terminals 18A and 18B are as shown in the parts A and B of FIG. 6, respectively. The delay times "$\tau$" of the delay circuits 31 and 32 are set as "$\tau = (2^n - 1)T_0$" so that the frequencies of the peaks and troughs in the frequency response characteristic curves of the separation filter 18 will be equal to the frequencies of the side bands of the composite spread spectrum signal SM(t). This setting enables the separation of the composite spread spectrum signal SM(t) into first components related to the angular frequency $\omega c_1$ and second components related to the angular frequency $\omega c_2$.

On the premise that the period of the spread codes P(t) and P(t−to) is equal to the delay time "$\tau$" and that an integral multiple of the period of the carriers cos $\omega c_1 t$ and sin $\omega c_1 t$ is equal to the period of the spread codes P(t) and P(t−to), the output signal from the adder 13 or the first component S1(t) of the composite spread spectrum signal SM(t) is expressed as:

$$S1(t) = \{d(t) + d(t-\tau)\}P(t)\cos\omega c_1 t + 2P(t-t_0)\sin\omega c_1 t$$

In addition, the output signal from the subtracter 15 or the second component S2(t) of the composite spread spectrum signal SM(t) is expressed as:

$$S2(t) = 2P(t)\cos\omega c_2 t + (1/2)\{d(t) + d(t - 2\tau) - 2d(t - \tau)\}P(t)\cos\omega c_1 t$$

The latter term in the right-hand side of this equation is extremely small and is negligible relative to the former term. Therefore, the second component S2(t) of the composite spread spectrum signal SM(t) is approximately expressed in the following equation.

$$S2(t) = 2P(t)\cos\omega c_2 t$$

The spread spectrum communication system according to this embodiment has advantages as follows.

(1) Receivers of conventional systems require a sync circuit in a despread process. A typical sync circuit is composed of a loop including a clock generator and a spread code generator. The spread spectrum communication system of this embodiment enables the omission of such a sync circuit.

(2) Since the spread spectrum communication system of this embodiment dispenses with such a sync circuit, it is possible to remove problems that a long time is spent in establishing sync, and that sync halts.

(3) Receivers of conventional systems require a complicated carrier-regenerating circuit in the sync demodulation of a primary modulation signal. In the spread spectrum communication system of this embodiment, the carrier is derived through the despread process and the single multiplier enables the sync demodulation of the primary modulation signal.

DESCRIPTION OF THE SECOND PREFERRED EMBODIMENT

FIG. 7 shows a second embodiment of this invention which is similar to the embodiment of FIGS. 1-6 except that a phase-locked loop (PLL) circuit 29 is used in place of the phase shifter 27 (see FIG. 2) in the receiver.

The PLL circuit 29 serves as a narrow pass band tracking filter which generates a carrier component "2 cos ($\omega c_1 - \omega c_2$)t" synchronous with a main component of the output signal from the BPF 24 and removes noises and other frequency components. The generated carrier component is fed from the PLL circuit 29 to the multiplier 9.

What is claimed is:

1. A transmitter of a spread spectrum communication system, comprising:

means for modulating a first carrier with an information signal to generate a primary modulation signal;

means for adding the primary modulation signal and a second carrier to generate an addition signal;

means for generating a first spread code and a second spread code in response to a clock signal, the second spread code being equal to the first spread code delayed by a predetermined time;

means for multiplying the addition signal and the first spread code to spread a spectrum of the addition signal with the first spread code to generate a first spread spectrum signal;

means for shifting a phase of the first carrier by a predetermined angle to generate a third carrier;

means for multiplying the third carrier and the second spread code to spread a spectrum of the third carrier with the second spread code to generate a second spread spectrum signal; and means for adding the first spread spectrum signal and the second spread spectrum signal to generate a composite spread spectrum signal.

2. A receiver of a spread spectrum communication system, comprising:

means for separating a composite spread spectrum signal into a first spread spectrum signal and a second spread spectrum signal related to a first predetermined frequency and a second predetermined frequency respectively;

means for multiplying the first spread spectrum signal and the second spread spectrum signal to generate a first despread spectrum signal;

means for delaying the second spread spectrum signal by a predetermined time to generate a third spread spectrum signal;

means for multiplying the first spread spectrum signal and the third spread spectrum signal to generate a second despread spectrum signal;

a first band pass filter filtering the first despread spectrum signal to demodulate a primary modulation signal from the first despread spectrum signal;

a second band pass filter filtering the second despread spectrum signal;

means for deriving a carrier component from an output signal of the second band pass filter; and means for mixing the demodulated primary modulation signal and the carrier component to perform sync demodulation to demodulate an information signal from the demodulated primary modulation signal.

3. The receiver of claim 2 wherein the carrier-deriving means comprises a phase shifter.

4. The receiver of claim 2 wherein the carrier-deriving means comprises a phase-locked loop circuit.

5. A spread spectrum communication system comprising a transmitter and a receiver, the transmitter including:
- means for modulating a first carrier with an information signal to generate a first primary modulation signal;
- means for adding the first primary modulation signal and a second carrier to generate an addition signal;
- means for generating a first spread code and a second spread code in response to a clock signal, the second spread code being equal to the first spread code delayed by a predetermined time;
- means for multiplying the addition signal and the first spread code to spread a spectrum of the addition signal with the first spread code to generate a first spread spectrum signal;
- means for shifting a phase of the first carrier by a predetermined angle to generate a third carrier;
- means for multiplying the third carrier and the second spread code to spread a spectrum of the third carrier with the second spread code to generate a second spread spectrum signal; and
- means for adding the first spread spectrum signal and the second spread spectrum signal to generate a composite spread spectrum signal;

the receiver including:
- means for separating the composite spread spectrum signal into a third spread spectrum signal and a fourth spread spectrum signal related to a frequency of the first carrier and a frequency of the second carrier respectively;
- means for multiplying the third spread spectrum signal and the fourth spread spectrum signal to generate a first despread spectrum signal;
- means for delaying the fourth spread spectrum signal by a predetermined time to generate a fifth spread spectrum signal;
- means for multiplying the third spread spectrum signal and the fifth spread spectrum signal to generate a second despread spectrum signal;
- a first band pass filter filtering the first despread spectrum signal to demodulate a second primary modulation signal, corresponding to the first primary modulation signal, from the first despread spectrum signal;
- a second band pass filter filtering the second despread spectrum signal;
- means for deriving a carrier component from an output signal of the second band pass filter, the carrier component being synchronous with the second primary modulation signal; and
- means for mixing the second primary modulation signal and the carrier component to perform sync demodulation to demodulate the information signal from the second primary modulation signal.

* * * * *